United States Patent
Kwon (10) Patent No.: US 11,390,233 B2
(45) Date of Patent: Jul. 19, 2022

(54) DRIVER SEAT AIRBAG APPARATUS

(71) Applicant: HYUNDAI MOBIS CO., LTD., Seoul (KR)

(72) Inventor: Oh Koang Kwon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/226,281

(22) Filed: Apr. 9, 2021

(65) Prior Publication Data

US 2021/0316687 A1 Oct. 14, 2021

(51) Int. Cl.
*B60R 21/203* (2006.01)
*B60R 21/215* (2011.01)

(52) U.S. Cl.
CPC .......... *B60R 21/203* (2013.01); *B60R 21/215* (2013.01)

(58) Field of Classification Search
CPC .. F16B 2/00; F16B 2/243; F16B 17/00; E05C 19/08; B60R 21/2035; B60R 21/2037; B60R 21/203; B60R 21/215; B60R 21/20; B60R 21/217
See application file for complete search history.

(56) References Cited

U.S. PATENT DOCUMENTS

| | | | | |
|---|---|---|---|---|
| 4,212,415 A * | 7/1980 | Neely | ..................... | B65D 83/06 222/231 |
| 5,100,015 A * | 3/1992 | Vanderstuyf | ......... | B65D 50/045 292/87 |
| 5,520,411 A * | 5/1996 | Lang | ..................... | B60R 21/217 403/283 |
| 5,788,268 A * | 8/1998 | Goss | ................... | B60R 21/2035 280/728.2 |
| 5,797,622 A * | 8/1998 | Turner | ..................... | B62D 1/10 74/492 |
| 5,816,608 A * | 10/1998 | Tanabe | .................. | B60R 21/217 280/728.2 |
| 5,829,777 A * | 11/1998 | Sakurai | ................. | B60R 21/217 280/728.2 |
| 5,931,514 A * | 8/1999 | Chung | .................... | F16B 12/26 292/87 |
| 6,006,941 A * | 12/1999 | Hitchings | ............ | B65D 50/046 220/326 |

(Continued)

FOREIGN PATENT DOCUMENTS

KR 20-0387313 6/2005

OTHER PUBLICATIONS

English Language Abstract for KR 20-0387313 published Jun. 17, 2005.

*Primary Examiner* — Paul N Dickson
*Assistant Examiner* — Timothy Wilhelm
(74) *Attorney, Agent, or Firm* — DLA Piper LLP (US)

(57) ABSTRACT

A driver seat airbag apparatus may include: a mounting plate having a housing space formed at the front thereof; a cover having an insertion part and a pressing part, wherein the insertion part is formed at the rear of the cover and inserted into the housing space, and the pressing part is formed at the front of the insertion part; and a coupling part formed at each of the mounting plate and the outer surface of the insertion part, and comprising a male portion and a female portion that are locked to each other when the insertion part is inserted into the housing space.

6 Claims, 7 Drawing Sheets

(56) References Cited

U.S. PATENT DOCUMENTS

| | | | | |
|---|---|---|---|---|
| 6,186,535 B1* | 2/2001 | Sugiyama | B60R 21/217 | 280/728.2 |
| 6,318,585 B1* | 11/2001 | Asagiri | B60R 22/34 | 220/326 |
| 6,409,208 B1* | 6/2002 | Frisch | B60R 21/217 | 280/728.2 |
| 6,419,261 B1* | 7/2002 | Ibe | B60R 21/217 | 280/728.2 |
| 6,702,319 B2* | 3/2004 | Sczeburek | B60R 21/217 | 280/728.2 |
| 6,752,415 B2* | 6/2004 | Nelson | B60R 21/217 | 280/728.2 |
| 6,783,150 B2* | 8/2004 | Ahlquist | B60R 21/2035 | 280/728.2 |
| 6,802,193 B1* | 10/2004 | Long | B60R 25/0222 | 74/552 |
| 7,055,854 B2* | 6/2006 | Jones | B60R 21/2037 | 280/728.2 |
| 7,293,794 B2* | 11/2007 | Clarke | B60R 21/2035 | 280/731 |
| 7,380,817 B2* | 6/2008 | Poli | B60R 21/2037 | 200/61.57 |
| 7,393,003 B2* | 7/2008 | Meson | B60R 21/2035 | 280/728.2 |
| 7,413,479 B1* | 8/2008 | Volpone | H01R 13/506 | 439/352 |
| 7,523,958 B2* | 4/2009 | Jang | B60R 21/213 | 280/730.2 |
| 7,708,309 B2* | 5/2010 | Kim | B60R 21/2035 | 280/731 |
| 7,758,065 B2* | 7/2010 | Weigand | B60R 21/2035 | 280/728.2 |
| 7,850,199 B2* | 12/2010 | Ahn | B60R 21/2037 | 200/61.54 |
| 8,205,908 B2* | 6/2012 | Matsu | B60R 21/2035 | 280/728.2 |
| 8,360,463 B2* | 1/2013 | Isayama | B60R 21/213 | 280/728.3 |
| 8,491,002 B2* | 7/2013 | Schneider | B60R 21/215 | 280/728.2 |
| 8,511,707 B2* | 8/2013 | Amamori | B60R 21/2035 | 280/728.2 |
| 8,820,781 B2* | 9/2014 | Sato | B60R 21/2037 | 280/731 |
| 8,931,799 B2* | 1/2015 | Onohara | B60R 21/215 | 280/728.2 |
| 9,180,831 B2* | 11/2015 | Ko | B60R 21/203 | |
| 9,415,738 B2* | 8/2016 | Mazzocchi | B60R 21/205 | |
| 9,599,279 B2* | 3/2017 | Morris | F16M 11/041 | |
| 9,758,110 B2* | 9/2017 | Morris | B60K 37/02 | |
| 9,783,147 B2* | 10/2017 | Spencer | B60R 21/2035 | |
| 9,821,935 B2* | 11/2017 | Fujii | H05K 5/0052 | |
| 9,849,750 B2* | 12/2017 | Suzuki | B62D 25/142 | |
| 10,150,441 B2* | 12/2018 | Sella | B60R 21/2037 | |
| 10,196,028 B2* | 2/2019 | Yamami | B60R 21/2037 | |
| 10,532,715 B2* | 1/2020 | Jacqmarcq | B60R 21/203 | |
| 10,865,819 B2* | 12/2020 | Salinas-Fox | F16B 5/0664 | |
| 11,155,229 B2* | 10/2021 | Ducardonnet | B60R 21/2035 | |
| 11,208,069 B2* | 12/2021 | Kang | B60R 21/217 | |
| 2002/0113419 A1* | 8/2002 | Kai | B60Q 5/003 | 280/731 |
| 2014/0352118 A1* | 12/2014 | Ko | B60R 21/21656 | 24/592.1 |

\* cited by examiner

DRIVER SEAT AIRBAG APPARATUS

CROSS-REFERENCE TO RELATED APPLICATION

This application claims priority from and the benefit of Korean Patent Application No. 10-2020-0044006 filed on Apr. 10, 2020 which is hereby incorporated by reference for all purposes as if set forth herein.

BACKGROUND

Field

Exemplary embodiments of the present disclosure relate to a driver seat airbag apparatus, and more particularly, to a driver seat airbag apparatus capable of improving the coupling force between a mounting plate and a cover.

Discussion of the Background

In general, airbag systems for vehicles refer to devices that can instantaneously inflate an airbag in case of a vehicle collision, thereby reducing an injury caused by an impact.

Among the airbag systems, a driver seat airbag system installed at a driver seat instantaneously inflates an airbag between the driver seat and a steering wheel in case of a vehicle collision, thereby reducing an injury caused by an impact. The driver seat airbag apparatus is disposed in the steering wheel, and deploys the airbag using gas generated by a gas supply unit (inflator) installed therein in case of a vehicle accident, thereby protecting the driver seat.

Such a driver seat airbag apparatus is packaged on a mounting plate fixed to a coupling part (also referred to as a wheel armature) of the steering wheel, and a cover is coupled to the top of the mounting plate.

However, the conventional driver seat airbag apparatus has a complex structure to couple the mounting plate and the cover, and the cover could be separated from the mounting plate by a force which is generated when the airbag is deployed.

The related art of the present disclosure is disclosed in Korean Utility Model Registration No. 20-0387313 registered on Jun. 8, 2005 and entitled "Air Bag Housing Assembly for Vehicles".

SUMMARY

Various embodiments are directed to a driver seat airbag apparatus which can improve the coupling force between a mounting plate and a cover, simplify the structure through reduction in the number of parts, and have a reduced volume so as to easily secure an installation space.

In an embodiment, a driver seat airbag apparatus may include: a mounting plate having a housing space formed at a front thereof; a cover having an insertion part and a pressing part, wherein the insertion part is formed at a rear of the cover and inserted into the housing space, and the pressing part is formed at a front of the insertion part; and a coupling part formed at each of the mounting plate and an outer surface of the insertion part, and constituted by a male portion and a female portion which are locked to each other when the insertion part is inserted into the housing space.

The coupling part may include: a locking hole formed at a circumferential surface of the mounting plate; and a locking protrusion protruding from an outer surface of the cover, and inserted into the corresponding locking hole when the insertion part is inserted into the housing space.

One end of the locking protrusion, located in an opposite direction to a coupling direction, may be locked to the locking hole, when the locking protrusion is inserted into the locking hole.

The coupling part may further include a deformable bending part formed through the mounting plate from an outer surface to an inner surface of the mounting plate, and the bending part may be bent and pressed against the outer surface of the cover, with the locking protrusion inserted into the locking hole.

The bending part may have cut holes formed on both sides of the locking hole, and the cut holes may be formed through the mounting plate from the outer surface to the inner surface of the mounting plate.

The locking protrusion may further have an inclined surface formed at one end thereof in the coupling direction, and the inclined surface may be inclined downward toward the cover in the coupling direction.

The cover may further have a seating groove formed at the outer surface thereof, such that the locking protrusion is located in an inner region of the seating groove, and the bending part may be bent and inserted into the corresponding seating groove, with the locking protrusion inserted into the locking hole.

The mounting plate may have an auxiliary coupling hole formed at a rear surface thereof along an edge thereof, and the cover may have an auxiliary coupling protrusion which is formed at a rear surface thereof and protruded and inserted into the corresponding auxiliary coupling hole when the cover is inserted into the housing space.

The mounting plate may be formed of a metallic material.

The driver seat airbag apparatus in accordance with the embodiment of the present disclosure can improve the coupling force between the mounting plate and the cover, simplify the structure through reduction in the number of parts, and have a reduce volume, thereby easily securing the installation space.

DETAILED DESCRIPTION OF THE ILLUSTRATED EMBODIMENTS

Hereafter, preferred embodiments of the present disclosure will be described in detail with reference to the accompanying drawings.

The advantages and features of the present disclosure and a method for accomplishing the advantages and features will be clearly understood with reference to the embodiments which will be described below in detail with the accompanying drawings.

However, the present disclosure is not limited to the following embodiments, and may be implemented in various manners. The present embodiments are provided only to make the present disclosure through and complete and fully convey the scope of the present disclosure to those skilled in the art to which the present disclosure pertains, and the present disclosure is defined only by the scope of the claims.

Moreover, in describing the present disclosure, detailed descriptions for a related publicly-known technology and the like will be ruled out in order not to unnecessarily obscure subject matters of the present disclosure.

Figure 1:
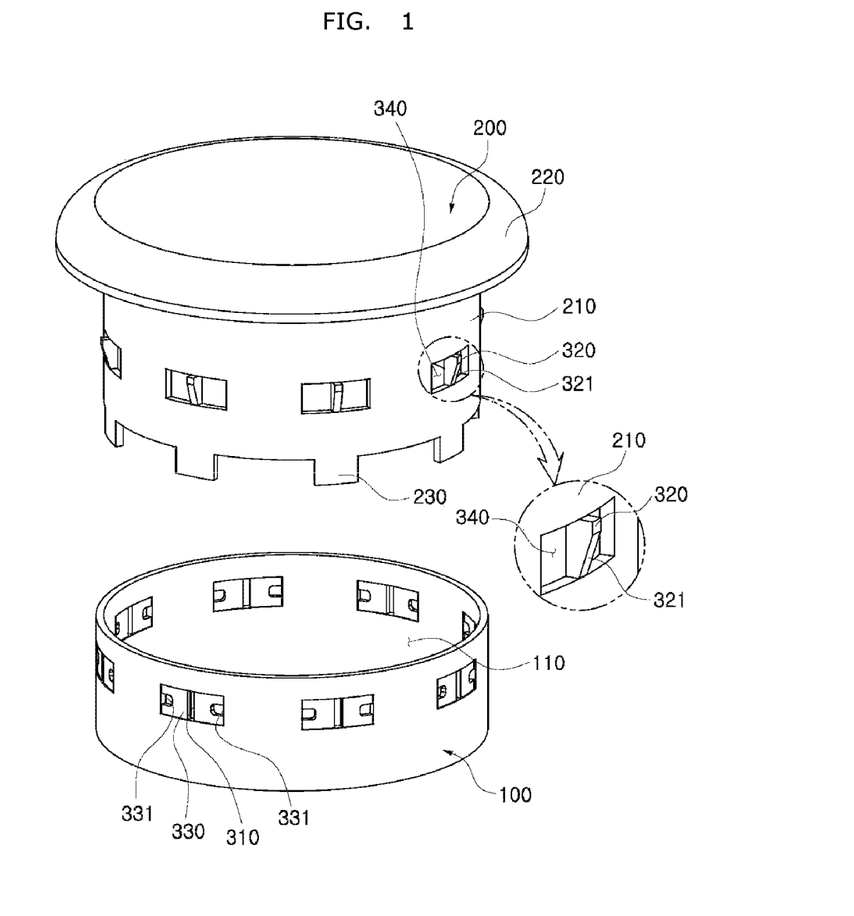
FIG. 1 is an exploded perspective view illustrating that a mounting plate and a cover of a driver seat airbag apparatus in accordance with an embodiment of the present disclosure are separated from each other.
Figure 2:
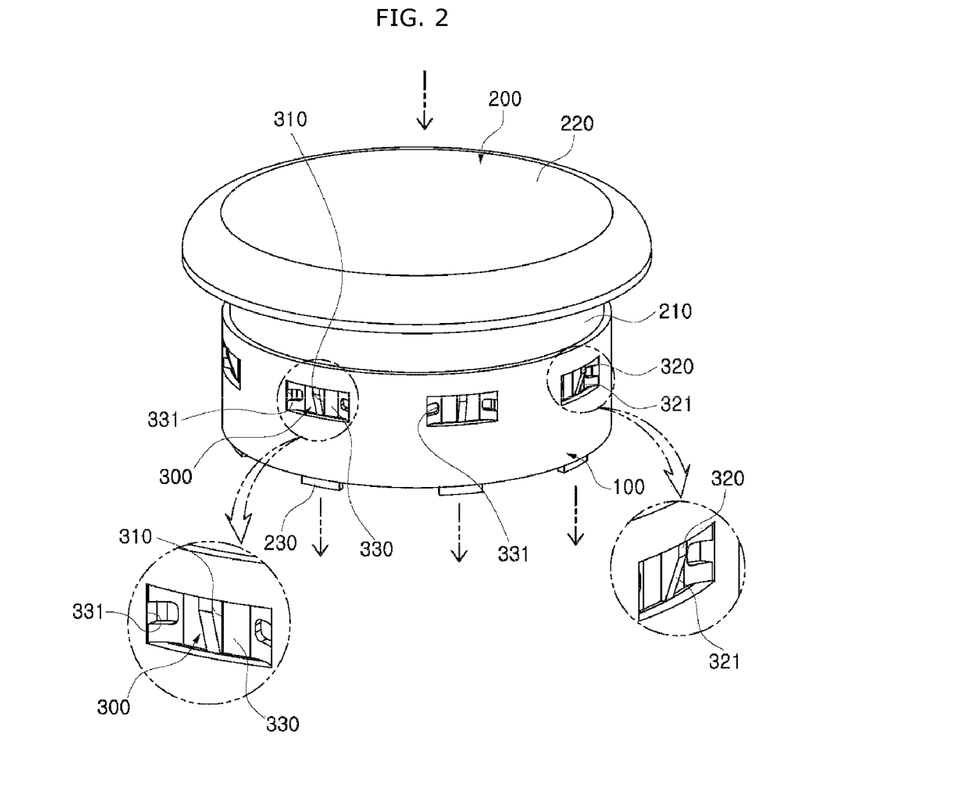
FIG. 2 is an assembled perspective view illustrating that the mounting plate and the cover of the driver seat airbag apparatus in accordance with the embodiment of the present disclosure are coupled to each other.
Figure 3:
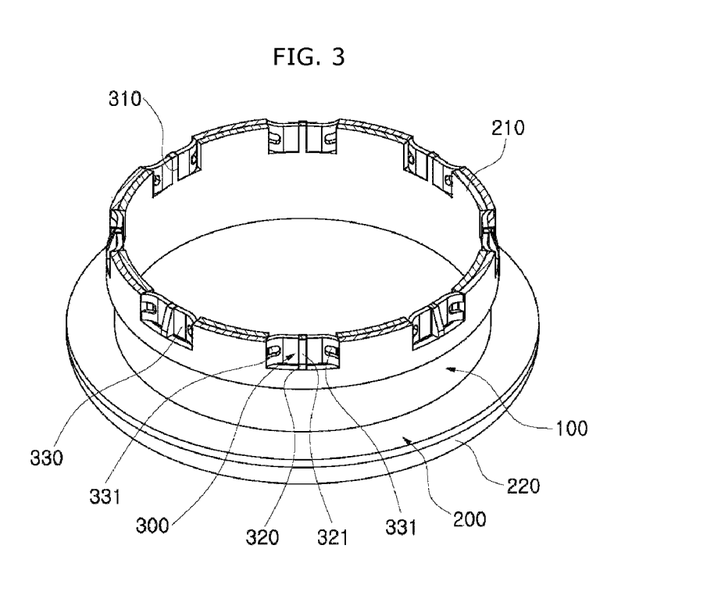
FIG. 3 is a bottom perspective view illustrating that the mounting plate and the cover of the driver seat airbag apparatus in accordance with the embodiment of the present disclosure are coupled to each other.

FIG. 1 is an exploded perspective view illustrating that a mounting plate and a cover of a driver seat airbag apparatus in accordance with an embodiment of the present disclosure are separated from each other, FIG. 2 is an assembled perspective view illustrating that the mounting plate and the cover of the driver seat airbag apparatus in accordance with the embodiment of the present disclosure are coupled to each other, and FIG. 3 is a bottom perspective view illustrating that the mounting plate and the cover of the driver seat airbag apparatus in accordance with the embodiment of the present disclosure are coupled to each other.

Figure 4:
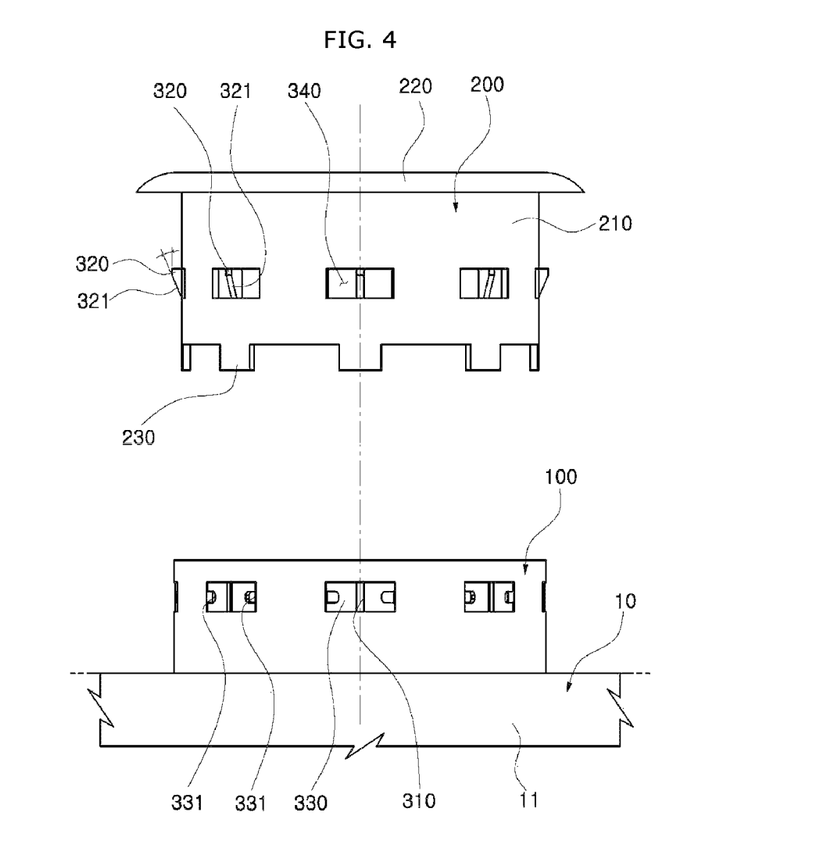
FIG. 4 is a side view illustrating that the mounting plate and the cover of the driver seat airbag apparatus in accordance with the embodiment of the present disclosure are separated from each other.
Figure 5:
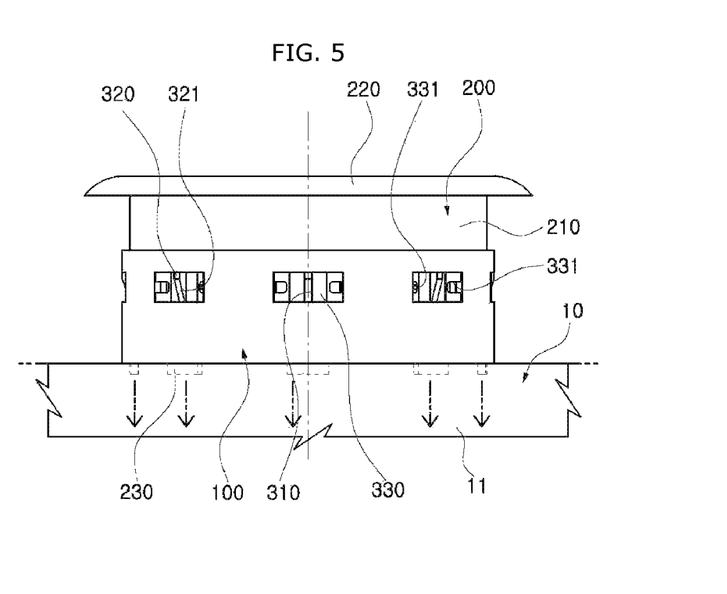
FIG. 5 is a side view illustrating that the mounting plate and the cover of the driver seat airbag apparatus in accordance with the embodiment of the present disclosure are coupled to each other.

FIG. 4 is a side view illustrating that the mounting plate and the cover of the driver seat airbag apparatus in accordance with the embodiment of the present disclosure are separated from each other, and FIG. 5 is a side view illustrating that the mounting plate and the cover of the driver seat airbag apparatus in accordance with the embodiment of the present disclosure are coupled to each other.

Figure 6:
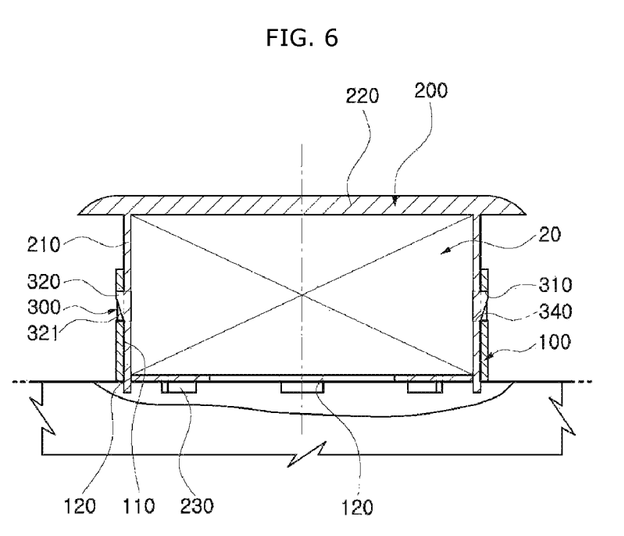
FIG. 6 is a side cross-sectional view illustrating that the mounting plate and the cover of the driver seat airbag apparatus in accordance with the embodiment of the present disclosure are coupled to each other.
Figure 7:
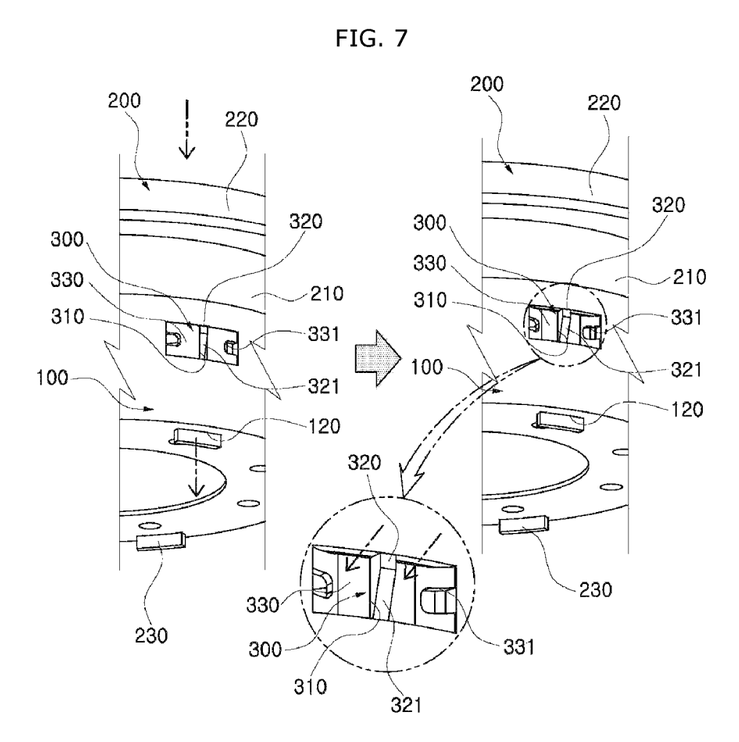
FIG. 7 is a view illustrating a process of coupling the mounting plate and the cover of the driver seat airbag apparatus in accordance with the embodiment of the present disclosure.

FIG. 6 is a side cross-sectional view illustrating that the mounting plate and the cover of the driver seat airbag apparatus in accordance with the embodiment of the present disclosure are coupled to each other, and FIG. 7 is a view illustrating a process of coupling the mounting plate and the cover of the driver seat airbag apparatus in accordance with the embodiment of the present disclosure.

Referring to FIGS. 1 to 7, the driver seat airbag apparatus in accordance with the embodiment of the present disclosure is installed at a driver seat of a vehicle, and includes a mounting plate 100, a cover 200 and a coupling part 300.

The mounting plate 100 may be coupled to a steering wheel 10 of the vehicle, such that the rear surface of the mounting plate 100 is seated on the front surface of a coupling part 11 formed in the steering wheel 10.

The mounting plate 100 may have a fastening structure (not illustrated) for coupling the mounting plate 100 to the coupling part 11. Alternatively, the mounting plate 100 may be fixed to the coupling part 11 of the steering wheel 10 by a separate fastening member (not illustrated).

The mounting plate 100 may be manufactured in a cylindrical shape and formed of a deformable material such as metal. The mounting plate 100 has a concave housing space 110 formed at the front surface thereof and having a predetermined area.

Desirably, the mounting plate 100 may have a cylindrical shape, but the shape of the mounting plate 100 may be modified in various manners, if necessary.

A cushion 30 of the airbag system may be contracted and housed in the housing space 110, and a gas supply unit such as an inflator (not illustrated) for supplying gas may be connected to the cushion 30. At this time, the gas supply unit may be installed in the housing space 110.

The cover 200 is coupled to the front of the mounting plate 100, and may have an insertion part 210 and a pressing part 220. The insertion part 210 may be formed at the rear thereof so as to be inserted into the housing space 110, and the pressing part 220 may be formed at the front surface of the insertion part 210.

The insertion part 210 may protrude in a cylindrical shape so as to correspond to the housing space 110, and have a space formed therein so as to be open to the rear thereof.

When the insertion part 210 is coupled into the housing space 110, the outer surface of the insertion part 210 may be pressed against the inner surface of the housing space 110, and a protruding end of the insertion part 210 may be pressed against the bottom surface of the housing space 110.

The pressing part 220 may be exposed to the front of the steering wheel 10, and have a tear line (not illustrated) formed on a part thereof, such that the cushion 30 protrudes forward when the airbag system is operated.

That is, during the operation of the airbag system, the cushion 30 may be inflated by gas supplied by the gas supply unit, and protruded and deployed forward while tearing the tear line of the pressing part 220.

The coupling part 300 is formed on each of the outer surfaces of the mounting plate 100 and the insertion part 210, and is constituted by male and female portions which are locked to each other when the insertion part 210 of the cover 200 is inserted into the housing space 110.

Specifically, the coupling part 300 may include a locking hole 310 and a locking protrusion 320. The locking hole 310 may be formed through the mounting plate 100 from the outer surface to the inner surface of the mounting plate 100, and the locking protrusion 320 may protrude from the outer surface of the cover 200, and be inserted into the corresponding locking hole 310 when the insertion part 210 is inserted into the housing space 110.

The locking hole 310 may have a length in a coupling direction, and the locking protrusion 320 may have a length in the coupling direction so as to correspond to the locking hole 310. When the locking protrusion 320 is inserted into the locking hole 310, one end of the locking protrusion 320, located in the opposite direction to the coupling direction, is locked to the locking hole 310.

In this state, the locking protrusion 320 inserted into the locking hole 310 is located at a position within the thickness of the locking hole 310, and the coupling between the mounting plate 100 and the insertion part 210 is maintained by the locking protrusion 320 locked to the locking hole 310 through the male-female locking structure.

At this time, both ends of the locking protrusion 320 in the coupling direction of the mounting plate 100 and the insertion part 210 are locked to both ends of the locking hole 310 in the circumferential direction of the mounting plate 100, respectively.

The locking protrusion 320 may further have an inclined surface 321 formed at one end thereof in the coupling direction, and the inclined surface 321 may be inclined downward toward the cover in the coupling direction.

When the insertion part 210 of the cover 200 is inserted into the housing space 110 of the mounting plate 100, the inclined surface 321 functions to guide the insertion part 210 of the cover 200 such that the insertion part 210 is not locked to the front end of the mounting plate 100.

Furthermore, a plurality of locking protrusions 320 may be formed along the circumference of the mounting plate 100, and a plurality of locking holes 310 may be formed along the circumference of the insertion part 210 so as to correspond to the respective locking protrusions 320.

The mounting plate 100 may have a plurality of deformable bending parts 330 formed on the outer surface thereof along the circumference thereof. Each of the bending parts 330 may have the locking hole 310 formed in an inner region thereof.

The bending part 330 may be bent by pressing the bending part 330 toward the inner surface of the mounting plate 100 after the insertion part 210 of the cover 200 is inserted into the housing space 110.

At this time, the state in which both ends of the bending part 330 are connected to the mounting plate 100 is maintained, and the state in which the inner surface of the bending part 330 is pressed against the outer surface of the insertion part 210 is maintained.

In this state, the locking protrusion 320 may be inserted and locked to the locking hole 310, and deformed while pressed against the inner surface of the bending part 330. Thus, the length of the locking protrusion 320, which is inserted through the locking hole 310, may be further increased.

The bending part 330 has cut holes 331 formed on both sides of the locking hole 310, and the cut holes 331 are formed through the mounting plate 100 from the outer surface to the inner surface of the mounting plate 100.

The cut holes 331 may be formed in the circumferential direction of the mounting plate 100 based on the locking hole 310. Since both ends of the bending part 330 have a small width due to the cut holes 331, the bending part 330 may be easily bent and deformed.

The cover 200 further has a seating groove 340 formed on the outer surface thereof, such that the locking protrusion 320 is formed in an inner region of the seating groove 340. The seating groove 340 is formed at a position corresponding to the bending part 330. The seating groove 340 may be formed through the cover 200 toward the inner surface of the cover 200.

The inner surface of the bending part 330 to be bent and deformed is inserted into the seating groove 340. With the locking protrusion 320 inserted into the locking hole 310, the bending part 330 is bent and inserted into the corresponding seating groove 340.

In this state, since the inner surface of the bending part 330 is inserted and locked to the seating groove 340, the coupling force between the mounting plate 100 and the insertion part 210 may be further improved, and an additional coupling structure may be formed even without a separate fastening part, which makes it possible to simplify the structure of the system.

Furthermore, the mounting plate 100 may have an auxiliary coupling hole 120 formed at the rear surface thereof along the edge thereof, and the cover 200 may have an auxiliary coupling protrusion 230 formed at the rear surface thereof. When the cover 200 is inserted into the housing space 110, the auxiliary coupling protrusion 230 may be inserted into the corresponding auxiliary coupling hole 120.

That is, when the mounting plate 100 and the insertion part 210 are coupled to each other, the auxiliary coupling protrusion 230 and the auxiliary coupling hole 120 are coupled to each other through a male-female structure. Thus, the mounting plate 100 and the insertion part 210 are not rotated in the circumferential direction.

Furthermore, the coupling positions of the locking protrusion 320 and the locking hole 310 may be easily adjusted by the coupling between the auxiliary coupling protrusion 230 and the auxiliary coupling hole 120.

Hereafter, referring to FIG. 7, the coupling process of the driver seat airbag apparatus in accordance with the embodiment of the present disclosure will be described as follows.

When the mounting plate 100 and the insertion part 210 of the cover 200 are coupled to each other, the insertion part 210 is inserted into the housing space 110, and the auxiliary coupling protrusion 230 is inserted through the auxiliary coupling hole 120.

Then, the locking protrusion 320 is slid while pressed against the inner surface of the housing space 110, and then inserted into the corresponding locking hole 310. At this time, the inclined surface 321 of the locking protrusion 320 secures the space into which the locking protrusion 320 can be inserted, while spreading the front end of the mounting plate 100 to the outside.

Then, when the bending part 330 is bent and deformed toward the insertion part 210 such that a part of the bending part 330 is inserted into the seating groove 340 of the insertion part 210, the inner surface of the bending part 330 is inserted and locked to the seating groove 340, and the bending part 330 is inserted into the seating groove 340. At this time, while the bending part 330 is pressed against the outer surface of the insertion part 210, the locking protrusion 320 is further inserted into the locking hole 310.

In this state, the auxiliary coupling protrusion 230 is inserted and locked to the auxiliary coupling hole 120, the locking protrusion 320 is inserted and locked to the locking hole 310, and the bending part 330 is inserted and locked to the seating groove 340.

The driver seat airbag apparatus in accordance with the embodiment of the present disclosure can improve the coupling force between the mounting plate 100 and the cover 200, simplify the structure through reduction in the number of parts, and have a reduce volume, thereby easily securing the installation space.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A driver seat airbag apparatus comprising:
   a mounting plate having a housing space formed at a front thereof;
   a cover having an insertion part and a pressing part, wherein the insertion part is formed at a rear of the cover and inserted into the housing space, and the pressing part is formed at a front of the insertion part; and
   a coupling part formed at each of the mounting plate and an outer surface of the insertion part, and comprising:
   a locking hole formed at a circumferential surface of the mounting plate,
   a locking protrusion protruding from an outer surface of the cover, and inserted into a corresponding locking hole when the insertion part is inserted into the housing space, wherein the locking protrusion further has an inclined surface formed at one end thereof in a coupling direction, a deformable bending part formed through the mounting plate from an outer surface to an inner surface of the mounting plate, wherein the bending part is bent and pressed against the outer surface of the cover, with the locking protrusion inserted into the locking hole, the bending part has cut holes formed on both sides of and non-contiguously with the locking hole, and the cut holes are formed through the mounting plate from the outer surface to the inner surface of the mounting plate.

2. The driver seat airbag apparatus of claim 1, wherein one end of the locking protrusion, located in an opposite direction to a coupling direction, is locked to the locking hole, when the locking protrusion is inserted into the locking hole.

3. The driver seat airbag apparatus of claim 1, wherein the locking protrusion further has an inclined surface formed at one end thereof in a coupling direction, wherein the inclined surface is inclined downward toward the cover in the coupling direction.

4. The driver seat airbag apparatus of claim 1, wherein the cover further has a seating groove formed at the outer surface thereof, such that the locking protrusion is located in an inner region of the seating groove, wherein the bending part is bent and inserted into a corresponding seating groove, with the locking protrusion inserted into the locking hole.

5. The driver seat airbag apparatus of claim 1, wherein the mounting plate has an auxiliary coupling hole formed at a rear surface thereof along an edge thereof, wherein the cover has an auxiliary coupling protrusion that is formed at a rear surface thereof and inserted into a corresponding auxiliary coupling hole when the cover is inserted into the housing space.

6. The driver seat airbag apparatus of claim 1, wherein the mounting plate is formed of a metallic material.

* * * * *